United States Patent
Chen

(10) Patent No.: US 10,983,211 B2
(45) Date of Patent: Apr. 20, 2021

(54) DISTANCE SENSING ASSEMBLY AND MOBILE TERMINAL INCLUDING THE SAME

(71) Applicant: BEIJING XIAOMI MOBILE SOFTWARE CO., LTD., Beijing (CN)

(72) Inventor: Chaoxi Chen, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 64 days.

(21) Appl. No.: 16/389,464

(22) Filed: Apr. 19, 2019

(65) Prior Publication Data

US 2019/0324142 A1   Oct. 24, 2019

(30) Foreign Application Priority Data

Apr. 23, 2018  (CN) .......................... 201810367784.X

(51) Int. Cl.
*G01S 17/08* (2006.01)
*G01S 7/481* (2006.01)
*H04M 1/02* (2006.01)

(52) U.S. Cl.
CPC ............. *G01S 17/08* (2013.01); *G01S 7/4811* (2013.01); *G01S 7/4818* (2013.01); *H04M 1/026* (2013.01)

(58) Field of Classification Search
CPC ...... G01S 17/08; G01S 7/4815; G01S 7/4811; G01S 7/4814; G01S 7/4818; H04M 1/026; H04M 1/72569
See application file for complete search history.

(56) References Cited

U.S. PATENT DOCUMENTS 5,317,140 A * 5/1994 Dunthorn ............... G06F 3/0421
                                                    250/206.1
2010/0194583 A1* 8/2010 Kawabata ............ H03K 17/941
                                                    340/3.6

(Continued)

FOREIGN PATENT DOCUMENTS

CN       102843473 A    12/2012
CN       204119279 U     1/2015

(Continued)

OTHER PUBLICATIONS

First Office Action issued to Chinese Application No. 201810367784.X dated Feb. 6, 2020 with English translation, (21p).

(Continued)

*Primary Examiner* — Chih-Cheng Kao
(74) *Attorney, Agent, or Firm* — Arch & Lake LLP

(57) ABSTRACT

A distance sensing assembly and a mobile terminal including the same are provided. The distance sensing assembly includes: an emitter array, a receiver array and a reflective mirror. The emitter array, the receiver array, and the reflective mirror are located below a cover plate of the mobile terminal. An orthographic projection of the reflective mirror on a plane of the cover plate covers at least a portion of a gap between the cover plate and an earpiece of the mobile terminal. Infrared light emitted by the emitter array passes, after being reflected by the reflective mirror, through the gap to be emitted out. The receiver array receives returned infrared light which is reflected, after passing through the gap, by the reflective mirror.

15 Claims, 6 Drawing Sheets

(56) References Cited

U.S. PATENT DOCUMENTS

| | | | |
|---|---|---|---|
| 2015/0041630 A1 | 2/2015 | Heng et al. | |
| 2016/0345113 A1 | 11/2016 | Lee et al. | |
| 2017/0003379 A1* | 1/2017 | Downing | G01S 17/36 |
| 2017/0126868 A1* | 5/2017 | Evans | G01S 17/04 |
| 2017/0157703 A1* | 6/2017 | Lessmueller | B23K 26/032 |
| 2018/0031728 A1* | 2/2018 | Han | G01S 17/04 |

FOREIGN PATENT DOCUMENTS

| | | |
|---|---|---|
| CN | 205545451 U | 8/2016 |
| CN | 205610701 U | 9/2016 |
| CN | 106453725 A | 2/2017 |
| CN | 106506746 A | 3/2017 |
| CN | 107071099 A | 8/2017 |
| CN | 107888726 A | 4/2018 |
| EP | 2325735 A2 | 5/2011 |

OTHER PUBLICATIONS

Extended European Search Report of counterpart EP Application No. 19169391.0 dated Oct. 8, 2019, (7p).
Notification to grant patent right for invention of Chinese Application No. 201810367784.X dated Feb. 2, 2021, (4p).

* cited by examiner

DISTANCE SENSING ASSEMBLY AND MOBILE TERMINAL INCLUDING THE SAME

CROSS-REFERENCE TO RELATED APPLICATION

This application is based upon and claims priority to Chinese Patent Application No. 201810367784.X, filed Apr. 23, 2018, the entire contents of which are incorporated herein by reference.

TECHNICAL FIELD

The present disclosure relates to the field of electronic technologies, and particularly, to a distance sensing assembly and a mobile terminal.

BACKGROUND

With the rapid development of electronic technologies, functions of mobile terminals such as mobile phones, tablet computers and the like have become more and more powerful. In order to sense the distance between a mobile terminal and a user in real time, distance sensors represented by the infrared optical displacement sensors are widely applied to mobile terminals to realize a distance detection function.

Currently, as shown in FIG. 1, usually, an opening is formed in a region other than the display region of the mobile terminal panel, and a distance sensor is arranged below the opening. The distance sensor emits and receives infrared light through the opening to perform distance detection.

SUMMARY

The present disclosure provides a distance sensing assembly and a mobile terminal.

According to a first aspect of the present disclosure, a distance sensing assembly is provided, wherein the distance sensing assembly includes: an emitter array, a receiver array and a reflective mirror. The emitter array, the receiver array, and the reflective mirror are located below a cover plate of a mobile terminal. An orthographic projection of the reflective mirror on a plane of the cover plate covers at least a portion of a gap between the cover plate and an earpiece of the mobile terminal. Infrared light emitted by the emitter array passes, after being reflected by the reflective mirror, through the gap to be emitted. The receiver array receives the returned infrared light which is reflected, after passing through the gap, by the reflective mirror.

According to a second aspect of the present disclosure, a distance sensing assembly is provided. The distance sensing assembly includes: an emitter array, a receiver array, a first light guide column and a second light guide column. The emitter array, the receiver array, the first light guide column, and the second light guide column are located below a cover plate of a mobile terminal. The first light guide column is configured to guide infrared light emitted by the emitter array toward a gap between the cover plate and an earpiece of the mobile terminal. The second light guide column is configured to guide the infrared light passing through the gap toward the receiver array.

According to a third aspect of the embodiments of the present disclosure, a mobile terminal is provided. The mobile terminal includes the distance sensing assembly as described in the first or second aspects.

It should be understood that both the foregoing general description and the following detailed description are only exemplary and explanatory and are not intended to limit the present disclosure.

BRIEF DESCRIPTION OF THE DRAWINGS

The accompanying drawings, which are incorporated in and constitute a part of this description, illustrate embodiments consistent with the present disclosure and, together with the description, serve to explain the principles of the present disclosure.

DESCRIPTION OF REFERENCE NUMERALS

Figure 1:
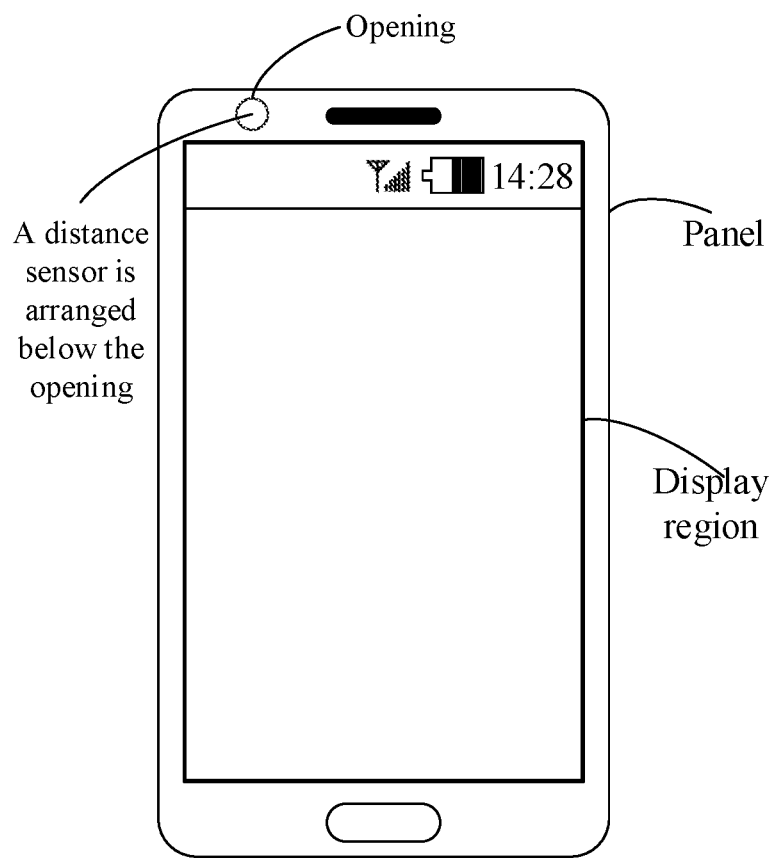
FIG. 1 is a schematically structural view of an existing terminal.

1: emitter array; 11: emitter; 2: receiver array; 21: receiver; 3: reflective mirror; 4: cover plate; 5: gap; 6: first light guide column; 7: second light guide column; and 8: diffusion sheet.

DETAILED DESCRIPTION

Hereinafter, exemplary embodiments will be described in detail. The examples thereof are shown in the drawings. In the following description when referring to the drawings, the same numerals in the different drawings denote the same or similar elements unless otherwise indicated. The examples described in the following exemplary embodiments do not represent all the examples consistent with the present disclosure. Instead, they are merely examples of devices and methods consistent with some aspects of the present disclosure as described in detail in the appended claims.

For ease of understanding, application scenarios involved in the embodiments of the present disclosure are introduced before the detailed description of the embodiments of the present disclosure.

With the rapid development of electronic technologies, functions of mobile terminals such as mobile phones, tablet computers and the like have become more and more powerful. In order to sense the distance between a mobile terminal and a user in real time, distance sensors represented by the infrared optical displacement sensors are widely applied to mobile terminals to realize a distance detection function. Currently, as shown in FIG. 1, usually, an opening is formed in a region other than the display region of the mobile terminal panel, and a distance sensor is arranged below the opening. The distance sensor emits and receives infrared light through the opening to perform distance detection. As the opening occupies a certain area on the panel, the area occupied by the display region on the panel would be limited. As a result, the screen-to-body ratio of the mobile terminal is reduced, which impedes the developing trend towards full-screen mobile terminals, and adversely influences the aesthetic effect of the mobile terminal. In view of this, the embodiments of the present disclosure provide a distance sensing assembly to increase the screen-to-body ratio of the mobile terminal, improve the display performance and the aesthetic effect of the mobile terminal.

The distance sensing assembly provided by the embodiments of the present disclosure will be described in detail below with reference to the accompanying drawings.

When the emitter array and the receiver array are arranged below the cover plate of the mobile terminal, in order to prevent the display region of the mobile terminal from being illuminated by infrared light emitted by the emitter array, the embodiments of the present disclosure adopt two manners to change the optical path, so as to effectively avoid the influence of the infrared light emitted by the emitter array on the display performance of the display region. In the first manner, the optical path is changed by arranging a reflective mirror; and in the second manner, the optical path is changed by arranging a light guide structure, such as a light guide column. The two manners will be described in detail separately through two embodiments as follows.

Figure 2:
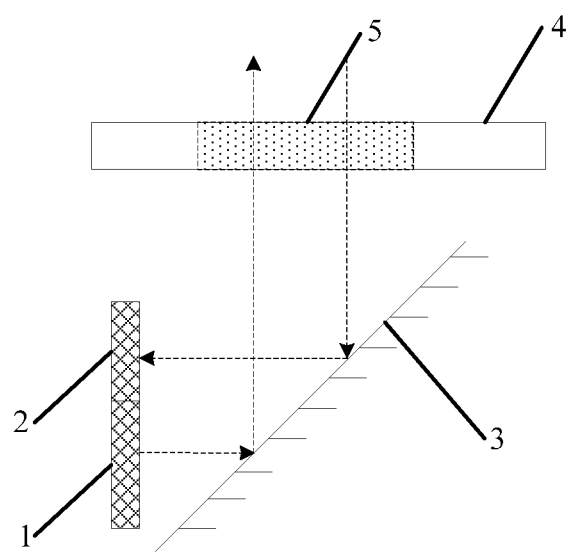
FIG. 2 is a schematically structural view of a first distance sensing assembly according to an aspect of the disclosure.

FIG. 2 is a schematically structural view of a first distance sensing assembly according to an aspect of the disclosure. This embodiment of the present disclosure is configured to explain the first manner. Referring to FIG. 2, the distance sensing assembly includes an emitter array 1, a receiver array 2 and a reflective mirror 3, and all these structures are located below a cover plate 4 of a mobile terminal. An orthographic projection of the reflective mirror 3 on a plane of the cover plate 4 covers at least a portion of a gap 5 between the cover plate 4 and an earpiece of the mobile terminal.

Referring to FIG. 2, the infrared light emitted by the emitter array 1 is reflected by the reflective mirror 3, then passes through the gap 5 to be emitted out. The receiver array 2 receives the infrared light which is reflected, after passing through the gap 5, by the reflective mirror 3.

The emitter array 1 and the receiver array 2 may be respectively integrated on two Integrated Circuit (IC) chips, or may be integrated on one IC chip, which is not limited in the embodiment of the present disclosure. The gap 5 may be an optical microgap which is a tiny gap that allows infrared light to travel through but is invisible to a human eye. Moreover, a light-transparent material may be arranged in the gap 5. That is, the gap 5 may be filled with the light-transparent material, so that the gap 5 could be prevented from being blocked by other materials in the process of manufacturing the panel of the mobile terminal. The light-transparent material refers to a material which allows the infrared light to travel through, for example, the light-transparent material may be a fiber optic material or the like.

It should be noted that, the distance sensing assembly is configured to detect the distance between the cover plate 4 and a user. The infrared light emitted by the emitter array 1 passes, after being reflected by the reflective mirror 3, through the gap 5, to be emitted out from the cover plate 4. Outside the cover plate 4, the infrared light reflected by an object such as the user's skin can pass through the gap and strike the reflective mirror 3; and then after being reflected by the reflective mirror 3, the infrared light is received by the receiver array 2.

When the mobile terminal mounted with the distance sensing assembly performs distance detection, the infrared light emitted by the emitter array 1 passes, after being reflected by the reflective mirror 3, through the gap 5 to be emitted out from the panel of the mobile terminal. The infrared light emitted out from the gap 5 would be reflected after contacting the user's skin. The returned infrared light reflected by the user's skin may pass through the gap 5 and reach the reflective mirror 3; and after being reflected by the reflective mirror 3, the returned infrared light is received by the receiver array 2. In this case, the mobile terminal can determine the distance based on the infrared light emitted by the emitter array 1 and the returned infrared light which is received, after being reflected by the user's skin, by the receiver array 2. By using the disclosed distance sensing assembly in a mobile terminal, there is no need to have a specific opening located in a region other than the display region of the panel. In such a terminal, no additional hole is needed in the display panel, and the area of the display region on the display panel would not be limited. Thus, the screen-to-body ratio of the mobile terminal could be increased, and the display performance and the aesthetic effect of the mobile terminal would be improved.

The distance sensing assembly may be configured to form a portion of a detection circuit for a distance sensor. The distance sensor is configured to detect the distance between the sensor per se and the user, where the distance sensing assembly can determine the distance between the panel and the user based on the time when the emitter array 1 emits infrared light and the time when the receiver array 2 receives the infrared light.

When the distance sensing assembly is arranged below the cover plate, referring to FIG. 3, the emitter array 1 and the receiver array 2 may be arranged in a direction perpendicular to the plane of the cover plate 4. In this case, an included angle a between a plane of the emitter array 1 and the receiver array 2 and the plane of the cover plate 4 is 90 degrees.

It should be noted that when the emitter array 1 and the receiver array 2 are arranged in a direction perpendicular to the plane of the cover plate 4, the direction of the infrared light emitted by the emitter array 1 may be parallel to the plane of the cover plate 4; and the direction of the infrared light received by the receiver array 2 may also be parallel to the plane of the cover plate, so that the display region of the mobile terminal is effectively prevented from being illuminated by the infrared light emitted by the emitter array 1 and the infrared light received by the receiver array 2. When arranging the emitter array 1 and the receiver array 2, the two arrays may be arranged side by side, or may be arranged vertically. Moreover, the emitter array 1 and the receiver array 2 may face the reflective mirror 3, which is not limited in the embodiment of the present disclosure.

In addition, when the emitter array 1 and the receiver array 2 are arranged in a direction perpendicular to the plane of the cover plate 4, the orthographic projection of the emitter array 1 and the receiver array 2 on the plane of the cover plate 4 is the smallest, for example, in a range of 1 mm to 3 mm. That is, the area occupied by the emitter array 1 and the receiver array 2 on the plane of the cover plate 4 is the smallest. In this way, it is ensured that the emitter array 1 and the receiver array 2 are closer to the edge of the cover plate 4, thereby avoiding the limitation of the emitter array 1 and the receiver array 2 on the antenna clearance region of the mobile terminal.

In a practical application, when the emitter array 1 is perpendicular to the plane of the cover plate 4, the region of the infrared light emitted by the emitter array 1 may be in a tapered shape. In this case, in order to prevent the display region of the mobile terminal from being illuminated by a portion of infrared light which is not parallel to the plane of the cover plate 4, a light-proof material could be arranged between said portion of the infrared light region and the display region. The light-proof material refers to a material which prevents infrared light from traveling through, and the light-proof material may be black paint, black rubber or the like. For example, when arranging the emitter array 1 and the receiver array 2 below the cover plate 4, it would be feasible that the emitter array 1 and the receiver array 2 are not perpendicular to the plane of the cover plate 4. In this case, it merely requires that the infrared light emitted by the emitter array 1 could pass through the gap 5 after being reflected by the reflective mirror 3, and the light-proof material is arranged between said portion of the infrared light region emitted by the emitter array 1 and the panel of the mobile terminal, which is not limited in the present disclosure.

Figure 3:
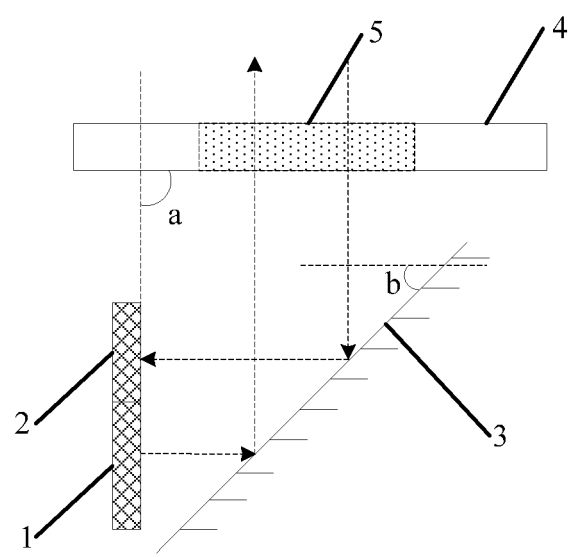
FIG. 3 is a schematically structural view of a second distance sensing assembly according to an aspect of the disclosure.

Referring to FIG. 3, the included angle b between the plane of the reflective mirror 3 and the plane of the cover plate 4 is 45 degrees.

It should be noted that when each of the emitter array 1 and the receiver array 2 is perpendicular to the plane of the cover plate 4, the infrared light emitted by the emitter array 1 is parallel to the plane of the cover plate 4. In order to ensure that the emitted infrared light is perpendicular, after being reflected by the reflective mirror 3, to the plane of the cover plate 4, and the infrared light received by the receiver array 2 is parallel to the plane of the cover plate 4, the included angle b between the plane of the reflective mirror 3 and the plane of the cover plate 4 may be 45 degrees.

Figure 4:
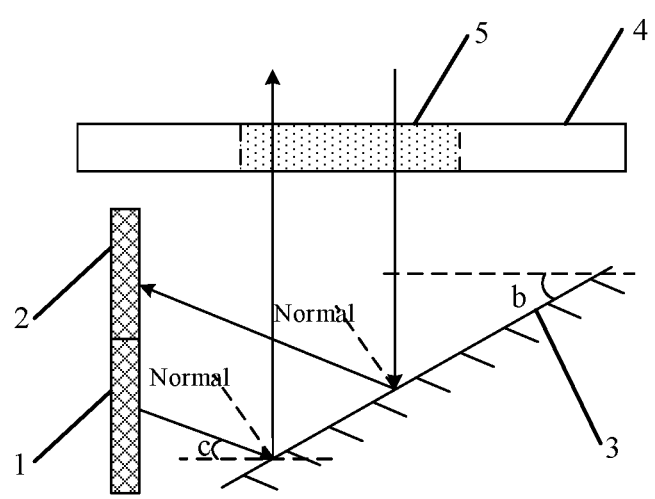
FIG. 4 is a schematically structural view of a third distance sensing assembly according to an aspect of the disclosure.

Here, for the portion of the infrared light emitted by the emitter array 1 which is not parallel to the plane of the cover plate 4, in order to ensure that the infrared light is perpendicular, after being reflected by the reflective mirror 3, to the plane of the cover plate 4, an included angle between the plane of the reflective mirror 3 and the plane of the cover plate 4 may also have different degrees, which is not limited in the embodiment of the present disclosure. For example, referring to FIG. 4, when an included angle c between the infrared light emitted by the emitter array 1 and the plane of the cover plate 4 is 30 degrees, in order to ensure that the infrared light after being reflected by the reflective mirror 3 is perpendicular to the plane of the cover plate 4, the included angle b between the plane of the reflective mirror 3 and the plane of the cover plate 4 may be 30 degrees. Note that the angle c may be in the range of 5 degrees to 60 degrees.

In addition, due to the limitation of the earpiece, there may be a certain distance present between the reflective mirror 3 and the gap 5. As such, when the infrared light emitted by the emitter array 1 is transmitted, after being reflected by the reflective mirror 3, to the gap 5, or when the infrared light reflected by the user's skin is transmitted, after passing through the gap 5, to strike the reflective mirror 3, the energy of the infrared light may be greatly attenuated due to the large distance between the reflective mirror 3 and the gap 5. As a result, it is likely that the infrared light which is emitted out, after passing through the gap 5, from the cover plate 4 cannot reach the user's skin, or the infrared light reflected by the user's skin cannot be received, after being reflected by the reflective mirror 3, by the receiver array 2, so that the distance between the panel of the mobile terminal and the user cannot be accurately detected.

Figure 5:
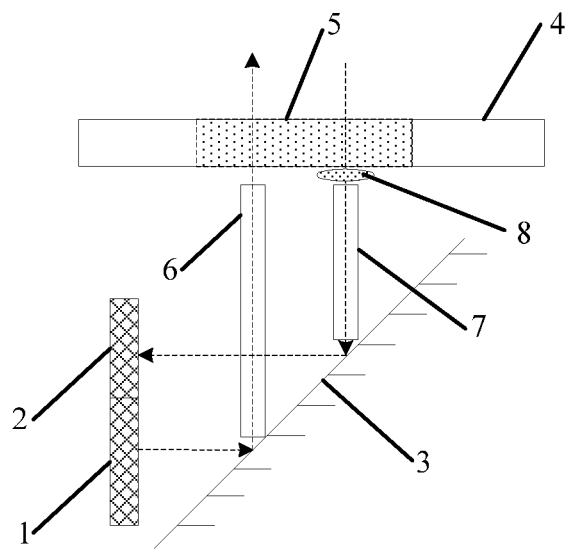
FIG. 5 is a schematically structural view of a fourth distance sensing assembly according to an aspect of the disclosure.

Therefore, referring to FIG. 5, the distance sensing assembly may further include a first light guide column 6 and a second light guide column 7. The first light guide column 6 and the second light guide column 7 are located between the reflective mirror 3 and the gap 5, and are respectively perpendicular to the plane of the cover plate 4. The first light guide column 6 is configured to guide the infrared light reflected by the reflective mirror 3 toward the gap 5. The second light guide column 7 is configured to guide the infrared light passing through the gap 5 toward the reflective mirror 3. As such the infrared light emitted by the emitter array 1 would be captured, after being reflected by the reflective mirror 3, by the first light guide column 6, and the captured infrared light would be guided toward the gap 5 to reduce the possible energy attenuation caused by the transmission of the infrared light from the reflective mirror 3 to the gap 5. Or, the infrared light reflected by the user's skin is captured, after passing through the gap 5, by the second light guide column 7, and the captured infrared light is guided toward the reflective mirror 3 to reduce the possible energy attenuation caused by the transmission of the infrared light from the gap 5 to the reflective mirror 3. Therefore, it is ensured that the infrared light emitted by the emitter array 1 could be normally received, after being reflected by the user's skin, by the receiver array 2, so as to determine the distance between the panel of the mobile terminal and the user.

It should be noted that, the first light guide column 6 and the second light guide column 7 may be a cylindrical structure or a quadrangular prismatic structure. Of course, the structure may be of other shapes, which is not limited in the embodiment of the present disclosure. The included angle between the first light guide column 6 or the second light guide column 7 and the plane of the cover plate 4 may not necessarily be 90 degrees. That is, the first light guide column 6 or the second light guide column 7 is not perpendicular to the plane of the cover plate 4. In this case, it merely requires that the first light guide column 6 can guide the infrared light reflected by the reflective mirror 3 toward the gap 5, and the second light guide column 7 can guide the infrared light passing through the gap 5 toward the reflective mirror 3, which is not limited in the embodiment of the present disclosure.

In addition, due to the limitation of the earpiece of the mobile terminal, there may be a large distance present between the upper end of the second light guide column 7 and the gap 5, so that the capturing angle of the second light guide column 7 upon capturing of the infrared light would be small. In this case, if the second light guide column 7 cannot capture any infrared light due to the small capturing angle, the receiver array 2 could not receive the infrared light reflected by the user's skin, so that the distance between the panel of the mobile terminal and the user could not be determined. Therefore, referring to FIG. 5, the distance sensing assembly may further include a diffusion sheet 8 between the second light guide column 7 and the gap 5. Through the diffusion sheet 8, the capturing angle of the second light guide column 7 can be increased to ensure that the infrared light reflected by the user's skin can be captured by the second light guide column 7 and can be guided toward the reflective mirror 3, and then the infrared light could be reflected by the reflective mirror 3 and received by the receiver array 2, so as to determine the distance between the panel of the mobile terminal and the user.

Figure 6:
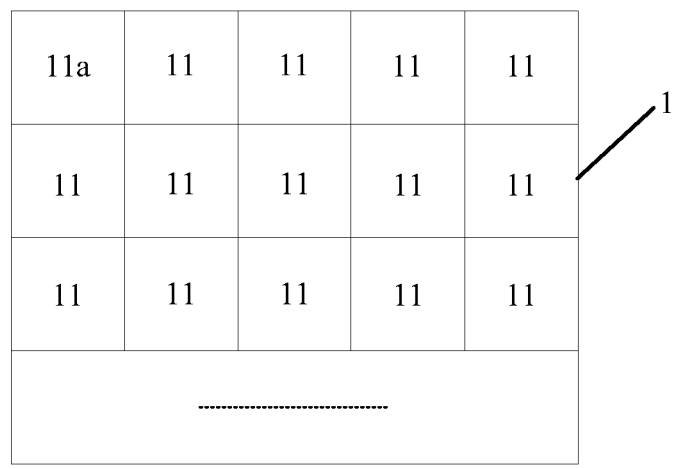
FIG. 6 is a schematically structural view of an emitter array according to an aspect of the disclosure.

Referring to FIG. 6, the emitter array 1 may include a plurality of emitters 11.

It should be noted that, each of the plurality of emitters 11 is configured to emit infrared light; and the plurality of emitters 11 can emit infrared light in a direction parallel to the cover plate 4. Of course, the plurality of emitters 11 may emit infrared light in different directions. For example, at least one emitter 11a of the plurality of emitters 11 may be a VCSEL, a light emitting diode, a laser diode, or the like.

In addition, when the emitters 11 are VCSELs, the light emitted by the emitters 11 is laser. The energy of the laser is stronger, and is unlikely to diverge, so that most of the infrared light emitted by the emitter array 1 can pass through the gap 5 and be emitted out from the panel. Moreover, the VCSEL is small in size, inexpensive, and easy to be integrated as the emitter array 1.

Figure 7:
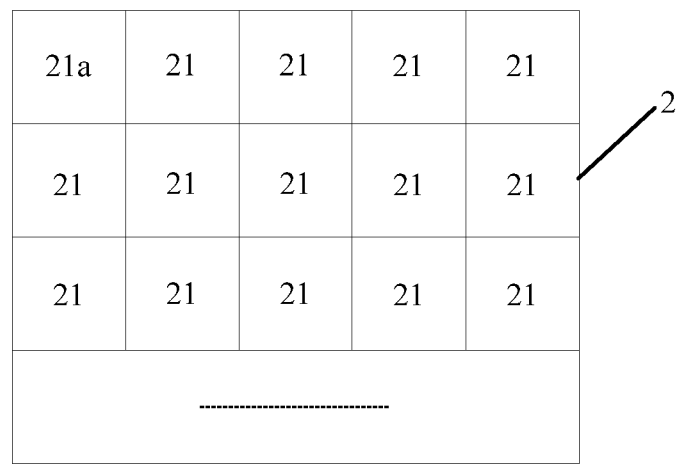
FIG. 7 is a schematically structural view of a receiver array according to an aspect of the disclosure.

Referring to FIG. 7, the receiver array 2 may include a plurality of receivers 21.

It should be noted that, each of the plurality of receivers 21 is configured to receive infrared light; and the plurality of receivers 21 can receive infrared light in a direction parallel to the cover plate 4. Of course, the plurality of receivers 21 may receive the infrared light in different directions. At least one receiver 21a of the plurality of receivers 21 may be an SPAD, an infrared ray receiving diode, or the like.

In addition, when the receivers 21 are SPADs which can receive faint infrared light, the infrared light receiving accuracy of the receiver array 2 can be improved.

Figure 8:
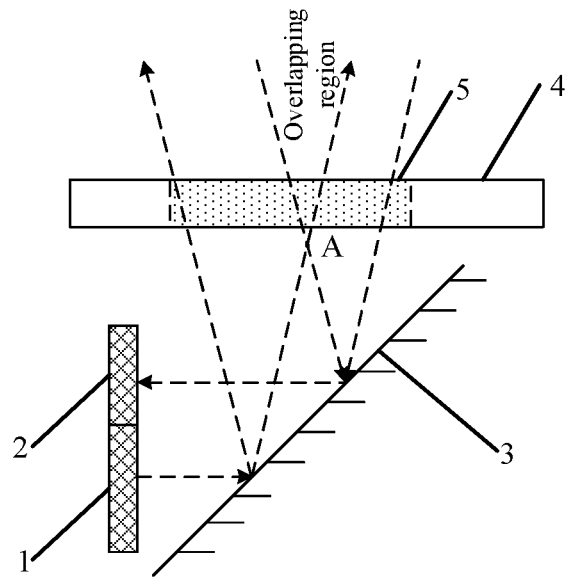
FIG. 8 is a schematically structural view of a fifth distance sensing assembly according to an aspect of the disclosure.

Referring to FIG. 8, an intersection point A of the infrared light emitted by the emitter array 1 after being reflected by the reflective mirror 3 and infrared light passing through the gap 5 to strike the reflective mirror 3 is located between the reflective mirror 3 and the gap 5.

It should be noted that, the emitter array 1 may include a plurality of emitters 11 which can emit infrared light in different directions. The receiver array 2 may include a plurality of receivers 21 which can receive infrared light in different directions. When an intersection point A of the infrared light emitted by the emitter array 1 after being reflected by the reflective mirror 3 and the infrared light passing through the gap 5 to strike the reflective mirror 3 is located between the reflective mirror 3 and the gap 5, an overlapping region between the region of the infrared light emitted by the emitter array 1 after being reflected by the reflective mirror 3 and the region of the infrared light passing through the gap 5 to strike the reflective mirror 3 would be larger, and in this overlapping region, infrared light emitted by the emitter array 1 can be received, after being reflected by the user's skin, by the receiver array 2. That is, when the user is in the overlapping area, the distance between the panel and the user can be accurately detected through the emitter array 1 and the receiver array 2; and the detection range is wider.

Figure 9:
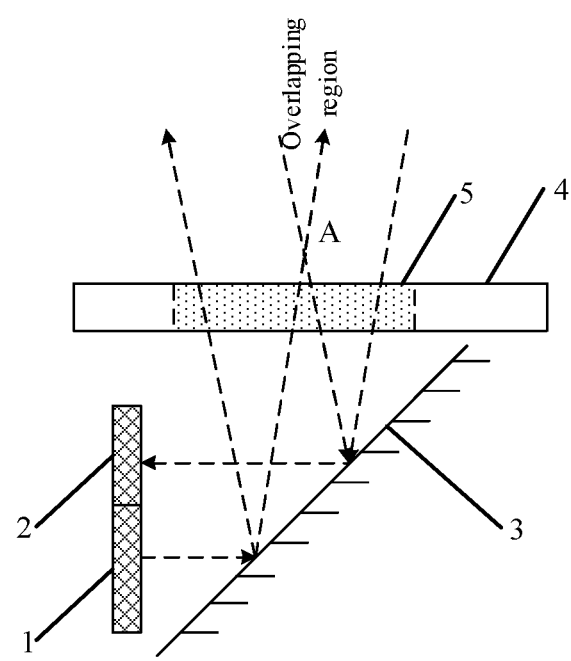
FIG. 9 is a schematically structural view of a sixth distance sensing assembly according to an aspect of the disclosure.

Of course, in a practical application, as shown in FIG. 9, the intersection point A of the infrared light emitted by the emitter array 1 after being reflected by the reflective mirror 3 and the infrared light passing through the gap 5 to strike the reflective mirror 3 may be located above the gap 5, which is not limited in the embodiment of the present disclosure.

In the embodiments of the present disclosure, the distance sensing assembly includes: an emitter array, a receiver array and a reflective mirror. The emitter array, the receiver array and the reflective mirror are located below a cover plate of the mobile terminal. An orthographic projection of the reflective mirror on a plane of the cover plate covers at least a portion of a gap between the cover plate and an earpiece of the mobile terminal. Infrared light emitted by the emitter array passes, after being reflected by the reflective mirror, through the gap; and the receiver array receives the infrared light which is reflected, after passing through the gap, by the reflective mirror. When using the mobile terminal mounted with the distance sensing assembly to perform distance detection, there is no need to have a specific opening located in a region other than the display region of a panel of the mobile terminal. Instead, the emitter array, the receiver array and the reflective mirror in the distance sensing assembly could be employed to detect the distance directly. As such, the panel could be prevented from being occupied by an additional hole and the area of the display region on the panel would not be limited. Thus, the screen-to-body ratio of the mobile terminal could be increased, the display performance and aesthetic effect of the mobile terminal would be improved. In addition, for the purpose of avoiding the condition that due to energy attenuation in the transmission process of infrared light, the infrared light passing through the gap could not be reflected by the user's skin, or the infrared light passing through the gap and then striking the reflective mirror could not be received by the receiver array after being reflected by the reflective mirror, the first light guide column and the second light guide column can be arranged between the reflective mirror and the gap, to capture the infrared light. As such, the energy attenuation could be avoided and the accuracy of the detection of the distance between the panel and the user could be ensured.

Figure 10:
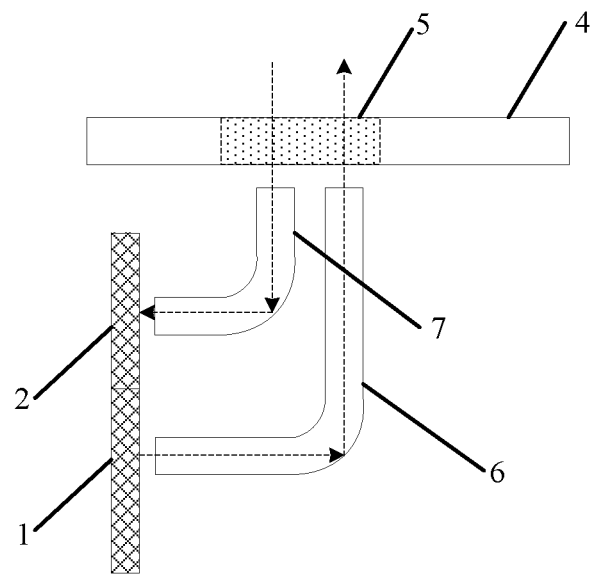
FIG. 10 is a schematically structural view of the first distance sensing assembly according to another aspect of the disclosure.

FIG. 10 is a schematically structural view of a distance sensing assembly according to an aspect of the disclosure. The embodiments of the present disclosure demonstrate the above second manner. Referring to FIG. 10, the distance sensing assembly includes an emitter array 1, a receiver array 2, a first light guide column 6 and a second light guide column 7, and all these structures are located below the cover plate 4 of the mobile terminal.

Referring to FIG. 10, the first light guide column 6 is configured to guide the infrared light emitted by the emitter array 1 toward the gap 5 between the cover plate 4 and the earpiece of the mobile terminal, and the second light guide column 6 is configured to guide the infrared light passing through the gap 5 toward the receiver array 2.

The emitter array 1, the receiver array 2, and the gap 5 can be arranged as described in the foregoing embodiments, and the details are not repeated here.

It should be noted that the distance sensing assembly is configured to detect a distance between the cover plate 4 and a user. The infrared light emitted by the emitter array 1 is guided toward the gap 5 through the first light guide column 6, and then passes through the gap 5 to be emitted out from the cover plate 4. Outside the cover plate 4, The infrared light reflected by the use's skin passes through the gap 5 and is then guided toward the receiver array 2 through the second light guide column 7 so as to be received by the receiver array 2.

When the mobile terminal mounted with the distance sensing assembly performs distance detection, the infrared light emitted by the emitter array 1 passes, after being guided by the first light guide column 6, through the gap 5, to be emitted out from the panel of the mobile terminal. The infrared light emitted from the gap 5 would be reflected after contacting the user's skin. The infrared light reflected by the user's skin would pass through the gap 5 and is guided toward the receiver array 2 through the second light guide column 7, so as to be received by the receiver array 2. At this time, the mobile terminal can determine the distance based on the infrared light emitted by the emitter array 1 and the infrared light which is received, after being reflected by the user's skin, by the receiver array 2. Since there is no need to have a specific opening located in a region other than the display region of the panel, the panel could be prevented from being occupied by an additional hole and the area of the display region on the panel would not be limited. Thus, the screen-to-body ratio of the mobile terminal could be increased, and the display performance and the aesthetic effect of the mobile terminal would be improved.

The distance sensing assembly is configured to form a portion of a detection circuit for a distance sensor. The distance sensor is configured to detect the distance between the sensor per se and the user, wherein the distance sensing assembly can determine the distance between the panel and the user based on the time when the emitter array 1 emits infrared light and the time when the receiver array 2 receives the infrared light.

When arranging the distance sensing assembly below the cover plate 4, referring to FIG. 11, the emitter array 1 and the receiver array 2 can be arranged in a direction perpendicular to the plane of the cover plate 4. In this case, an included angle d between a plane of the emitter array 1 and the receiver array 2 and the plane of the cover plate 4 may be 90 degrees.

It should be noted that, when the emitter array 1 and the receiver array 2 are arranged in a direction perpendicular to the plane of the cover plate 4, the orthographic projection of the emitter array 1 and the receiver array 2 on the plane of the cover plate 4 would be the smallest. That is, the area occupied by the emitter array 1 and the receiver array 2 on the plane of the cover plate 4 would be the smallest. In this case, it is ensured that the emitter array 1 and the receiver array 2 are closer to the edge of the panel, thereby avoiding the limitation of the emitter array 1 and the receiver array 2 on the antenna clearance region of the mobile terminal. When arranging the emitter array 1 and the receiver array 2, the arrays may be arranged side by side, or may be arranged vertically, which is not limited in the embodiment of the present disclosure.

In a practical application, when the emitter array 1 is perpendicular to the plane of the cover plate, a region of the infrared light emitted by the emitter array 1 may be in a tapered shape. In this case, in order to prevent the display region of the mobile terminal from being illuminated by infrared light which is not captured by the first light guide column 6, a light-proof material could be arranged between the region of the uncaptured infrared light and the display region. The light-proof material can be as described in the above embodiments. Of course, when arranging the emitter array 1 and the receiver array 2 below the cover plate, it would be feasible that the emitter array 1 and the receiver array 2 are not perpendicular to the plane of the cover plate 4. In this case, it merely requires that the infrared light emitted by the emitter array 1 could be captured by the first light guide column 6, and the light-proof material is arranged between the region of the uncaptured infrared light and the display region, which is not limited in the embodiment of the present disclosure.

Figure 11:
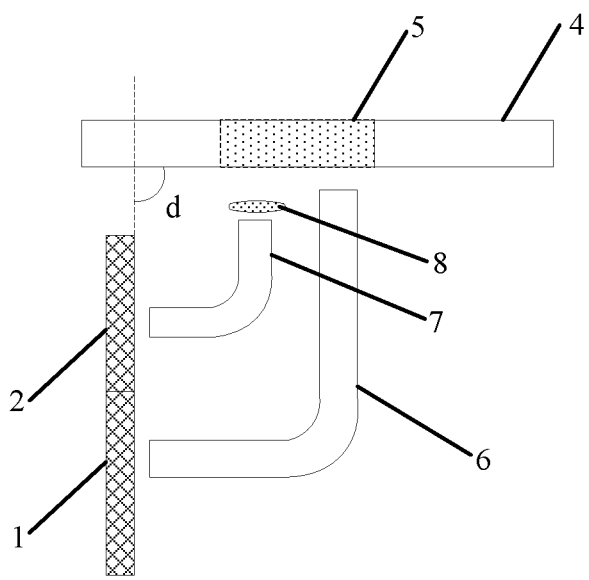
FIG. 11 is a schematically structural view of the first distance sensing assembly according to yet another aspect of the disclosure.

Referring to FIG. 10 or 11, both the first light guide column 6 and the second light guide column 7 are L-shaped light guide columns. In this case, the receiving end of the first light guide column 6 is perpendicular to the emitter array 1, and the guiding end of the first light guide column 6 is perpendicular to the gap 5, so that the infrared light emitted by the emitter array 1 can be captured effectively, and the captured infrared light is guided toward the gap 5. The receiving end of the second light guide column 7 is perpendicular to the gap 5, and the guiding end of the second light guide column 7 is perpendicular to the receiver array 2, so that the infrared light passing, after being reflected by the user's skin, through the gap 5 can be captured effectively, and the captured infrared light is guided toward the receiver array 2, thereby reducing the energy attenuation of the infrared light during transmission.

Of course, the first light guide column 6 and the second light guide column 7 may also be arc-shaped, or may be in other shapes, which is not limited in the embodiment of the present disclosure.

In addition, due to the limitation of the earpiece of the mobile terminal, there may be a large distance present between the upper end of the second light guide column 7 and the gap 5, so that the capturing angle of the second light guide column 7 upon capturing of the infrared light would be small. In this case, if the second light guide column 7 cannot capture the infrared light due to the small capturing angle, the receiver array 2 could not receive the infrared light reflected by the user's skin, so that the distance between the panel of the mobile terminal and the user could not be determined. Therefore, referring to FIG. 11, the distance sensing assembly may further include a diffusion sheet 8 between the second light guide column 7 and the gap 5. Through the diffusion sheet 8, the capturing angle of the second light guide column 7 can be increased to ensure that the infrared light reflected by the user's skin can be captured by the second light guide column 7 and can be guided toward the receiver array 2, so as to determine the distance between the panel of the mobile terminal and the user.

The emitter array 1 includes a plurality of emitters 11, and the receiver array 2 includes a plurality of receivers 21. The plurality of emitters 11 in the emitter array 1 and the plurality of receivers 21 in the receiver array 2 may be arranged as described in the above embodiments, which are not repeated here.

In the embodiments of the present disclosure, the distance sensing assembly includes an emitter array, a receiver array, a first light guide column and a second light guide column, and all these structures are located below the cover plate of the mobile terminal. The first light guide column is configured to guide the infrared light emitted by the emitter array toward the gap between the cover plate and the earpiece of the mobile terminal; and the second light guide column is configured to guide the infrared light passing through the gap toward the receiver array. When using the mobile terminal mounted with the distance sensing assembly to perform distance detection, there is no need to have a specific opening located in a region other than the display region of a panel of the mobile terminal. Instead, the emitter array, the receiver array and the reflective mirror in the distance sensing assembly could be employed to detect the distance directly. As such, the panel could be prevented from being occupied by an additional hole and the area of the display region on the panel would not be limited. Thus, the screen-to-body ratio of the mobile terminal could be increased, the display performance and aesthetic effect of the mobile terminal would be improved. In addition, for the purpose of avoiding the condition that the second light guide column cannot capture the infrared light reflected by the user's skin, a diffusion sheet is arranged at the receiving end of the second light guide column, namely, arranged between the second light guide column and the gap 5, so as to increase the capturing angel of the second light guide column. Thus, it is ensured that the second light guide column can capture the infrared light reflected by the user's skin and can guide it to the receiver array, thereby guaranteeing the accuracy of the detection of the distance between the panel and the user.

The embodiments of the present disclosure further provide mobile terminals mounted with any of the distance sensing assemblies shown in FIG. 2 to FIG. 2I or FIG. 3A to FIG. 3F. When using the mobile terminal to perform distance detection, there is no need to have a specific opening located in a region other than the display region of a panel of the mobile terminal. As such, the panel could be prevented from being occupied by an additional hole and the area of the display region on the panel would not be limited. Thus, the screen-to-body ratio of the mobile terminal could be increased, the display performance and aesthetic effect of the mobile terminal would be improved.

Other embodiments of the present disclosure will be apparent to those skilled in the art from the consideration of the specification after implementing the invention disclosed herein. This application is intended to cover any variations, uses, or adaptations of the present disclosure following the general principles thereof and including common knowledge or conventional technical measures which are not disclosed herein. The specification and embodiments are to be considered as exemplary only, with a true scope and spirit of the present disclosure indicated by the following claims.

It shall be appreciated that, the present disclosure is not limited to the exact construction which has been described above and illustrated in the accompanying drawings, while various modifications and changes can be made without departing from the scope thereof. It is intended that the scope of the present disclosure shall only be limited by the appended claims.

What is claimed is:

1. A distance sensing assembly, comprising:
   an emitter array disposed below a cover plate of a mobile terminal, the emitter array configured to emit infrared light;
   a reflective mirror disposed below the cover plate and configured to reflect the infrared light emitted by the emitter array;
   a receiver array disposed below the cover plate and configured to receive returned infrared light reflected by an object outside of the mobile terminal; and
   a first light guide column and a second light guide column,
   wherein an orthographic projection of the reflective mirror on a plane of the cover plate covers at least a portion of a gap between the cover plate and an earpiece of the mobile terminal;
   wherein the infrared light reflected by the reflective mirror passes through the gap to be emitted out from the cover plate;
   wherein the receiver array receives the returned infrared light which is reflected, after passing through the gap, by the reflective mirror;
   wherein the first light guide column and the second light guide column are located between the reflective mirror and the gap, and are respectively perpendicular to the plane of the cover plate; and
   wherein the first light guide column is configured to guide the infrared light reflected by the reflective mirror toward the gap; and the second light guide column is configured to guide the infrared light passing through the gap toward the reflective mirror.

2. The distance sensing assembly of claim 1, further comprising a diffusion sheet located between the second light guide column and the gap.

3. The distance sensing assembly of claim 1, wherein the emitter array and the receiver array are arranged in a direction perpendicular to the plane of the cover plate.

4. The distance sensing assembly of claim 3, wherein an included angle between a plane of the reflective mirror and the plane of the cover plate is 45 degrees.

5. The distance sensing assembly of claim 1, wherein an intersection point of the infrared light emitted by the emitter array after being reflected by the reflective mirror and the infrared light passing through the gap to strike the reflective mirror is located between the reflective mirror and the gap.

6. The distance sensing assembly of claim 1, wherein the emitter array comprises a vertical-cavity surface-emitting laser (VCSEL).

7. The distance sensing assembly of claim 1, wherein the receiver array comprises a single-photon avalanche diode (SPAD).

8. The distance sensing assembly of claim 1, wherein the distance sensing assembly is configured to form a portion of a detection circuit for a distance sensor.

9. A mobile terminal, comprising a distance sensing assembly that comprises:
   a cover plate;
   an emitter array disposed below the cover plate and configured to emit infrared light;
   a reflective mirror disposed below the cover plate and configured to reflect the infrared light emitted by the emitter array;
   a receiver array disposed below the cover plate and configured to receive returned infrared light reflected by an object outside of the mobile terminal; and
   a first light guide column and a second light guide column,
   wherein an orthographic projection of the reflective mirror on a plane of the cover plate covers at least a portion of a gap between the cover plate and an earpiece of the mobile terminal;
   wherein the infrared light reflected by the reflective mirror passes through the gap to be emitted out from the cover plate;
   wherein the receiver array receives the returned infrared light which is reflected, after passing through the gap, by the reflective mirror;
   wherein the first light guide column and the second light guide column are located between the reflective mirror and the gap, and are respectively perpendicular to the plane of the cover plate; and
   wherein the first light guide column is configured to guide the infrared light reflected by the reflective mirror toward the gap; and the second light guide column is configured to guide the infrared light passing through the gap toward the reflective mirror.

10. The mobile terminal of claim 9, wherein the emitter array comprises a vertical-cavity surface-emitting laser (VCSEL); and
   wherein the receiver array comprises a single-photon avalanche diode (SPAD).

11. The mobile terminal of claim 9, further comprising a diffusion sheet located between the second light guide column and the gap.

12. The mobile terminal of claim 9, wherein the emitter array and the receiver array are arranged in a direction perpendicular to the plane of the cover plate.

13. The mobile terminal of claim 12, wherein an included angle between a plane of the reflective mirror and the plane of the cover plate is 45 degrees.

14. The mobile terminal of claim 9, wherein an intersection point of the infrared light emitted by the emitter array after being reflected by the reflective mirror and the infrared light passing through the gap to strike the reflective mirror is located between the reflective mirror and the gap.

15. The mobile terminal of claim 9, wherein the distance sensing assembly is configured to form a portion of a detection circuit for a distance sensor.

* * * * *